United States Patent [19]

Farr

[11] 4,401,348
[45] Aug. 30, 1983

[54] HYDRAULIC ANTI-SKID BRAKING SYSTEMS FOR VEHICLES

[75] Inventor: Glyn P. R. Farr, Warwickshire, England

[73] Assignee: Lucas Industries Limited, Birmingham, England

[21] Appl. No.: 233,333

[22] Filed: Feb. 11, 1981

[30] Foreign Application Priority Data

Feb. 16, 1980 [GB] United Kingdom ............... 8005304

[51] Int. Cl.³ ............................................. B60T 8/02
[52] U.S. Cl. ..................................... 303/116; 303/68; 303/115
[58] Field of Search ................................... 303/10–12, 303/61–63, 68–69, 113, 114, 115, 116, 117, 118, 119; 188/181 A, 181 R

[56] References Cited

U.S. PATENT DOCUMENTS

| 3,524,684 | 8/1970 | Skoyles | 303/61 X |
| 3,724,914 | 4/1973 | Skoyles | 303/116 |
| 3,756,666 | 9/1973 | Leiber | 303/10 |

Primary Examiner—Douglas C. Butler
Attorney, Agent, or Firm—Scrivener, Clarke, Scrivener & Johnson

[57] ABSTRACT

In an anti-skid braking system a supply of operating fluid from a master cylinder to a vehicle brake is modulated in accordance with skid signals from a skid sensing mechanism. The system incorporates an hydraulic pump of the double-acting type having a plunger working in a bore and a working chamber which is in communication with a modulator assembly adapted to control brake application following skid correction.

23 Claims, 8 Drawing Figures

HYDRAULIC ANTI-SKID BRAKING SYSTEMS FOR VEHICLES

This invention relates to hydraulic anti-skid braking systems for vehicles of the kind in which a supply of operating fluid from a supply to a vehicle brake is modulated by a modulator assembly in accordance with skid signals from skid sensing means, and an hydraulic pump incorporating at least one plunger working in a bore has a working chamber which is in communication with the modular assembly to control brake re-application following skid correction.

An anti-skid braking system of the kind set forth is disclosed in our U.S. Pat. No. 4,340,258 which is equivalent to G.B. No. 2,029,941 published Mar. 26, 1980. In that system the pump is operable only to re-pressurise an expansion chamber following correction of a skid. This is achieved by the provision of disabler means for preventing the plunger of the pump from engaging with a drive until the dump valve, disposed between the expansion chamber of a modulator assembly for modulating the supply of operating fluid to the brake and a reservoir for fluid, has opened. Specifically the pump plunger is of differential outline adapted to work in a stepped bore with the end of greater area exposed to the operating fluid and the end of smaller area being engagable with the drive, and the disabler means comprise a spring for urging the smaller end of the plunger away from the drive in combination with the pressure in the working chamber which is generated by the operating pressure and which acts over an area of the plunger equal to the difference between opposite ends of the plunger. In such a construction pumping takes place upon movement of the plunger in one direction only, in which direction the pump force is generated by the supply of operating fluid, suitably a master cylinder, acting over the larger area of the pump plunger. During the induction stroke the pump plunger is moved in the opposite direction by the drive and against the force generated by the master cylinder and fluid is displaced back to the master cylinder. This subjects the hand, in the case of a motor cycle, to considerable pulsations.

In some installations a compromise must be reached between the magnitude of the pulsations and the speed of brake re-application which is determined by the output from the pump.

According to our invention, in an hydraulic anti-skid braking system of the kind set forth the pump is of the double-acting type to provide at least two pump delivery strokes for each pump cycle.

This eases the compromise discussed above between brake re-application rate and the magnitude of the pulsations.

The pump may be provided with two plungers of equal size which are oppositely arranged on opposite sides of a central drive. In such a construction the pulsations may be eliminated. If a degree of pulsation is required this can be achieved either by varying the relative sizes of the plungers or by varying the relative angular positions of the plungers.

However, in a preferred construction, the double-acting pump has a single plunger which is urged in one of two opposite directions by the supply of operating fluid and in the other of the said two opposite directions by the drive.

This enables us to provide, in a relatively cheaper pump, a predetermined degree of pulsation sufficient to warn the rider of a motor cycle of adverse road conditions.

Preferably the pump plunger is of differential outline working in a stepped bore, the end of smaller area of the plunger being exposed to the reservoir, the end of greater area being exposed to the working chamber, a first one-way valve permitting flow into the work chamber from the reservoir upon movement of the plunger in a first direction towards a drive mechanism, a second one-way valve permitting flow into the expansion chamber from the working chamber upon movement of the plunger in a second opposite direction, and a drive piston which may be an extension of the plunger for urging the plunger in the said first direction, the drive piston may be exposed at one end to the pressure in the working chamber and at the opposite end to the supply of operating fluid or if an extension of the plunger it is only exposed to the supply of operating fluid.

The smaller end of the pump plunger is spring loaded away from the drive mechanism by a tappet which has the reservoir on one side only and atmosphere at the end adjacent to the drive mechanism. Alternatively the tappet may be integral with the pump plunger.

The first one-way valve comprises a valve member adapted to be urged by a spring against a seating in the pump plunger, and the second one-way valve may comprise a valve member for engagement with a seating on the opposite side of a seal on the pump plunger from the first one-way valve. Alternatively the second one-way valve may comprise a valve seal on the pump plunger for permitting flow past that seal in response to movement of the pump plunger in one direction, a passage leading to the expansion chamber from the stepped bore at a position between the valve seal and a second seal between the bore and the portion of the plunger which is of smaller area and through which fluid is pumped past the valve seal upon movement of the plunger in the said second opposite direction and by the plunger itself upon movement of the plunger in the said first direction, with the second one-way valve in a closed position.

Our invention is particularly suitable for use in anti-skid braking systems in which the modulator assembly incorporates an expansion chamber to which the working chamber of the pump is connected, and a dump valve is disposed between the expansion chamber and the reservoir for fluid, the dump valve being movable by the skid sensing means between a normally closed position in which the expansion chamber is pressurised so that the modulator assembly is held in a first position permitting operating fluid to be supplied to the brake and an open position when the skid signal is received whereby the pressure in the expansion chamber is reduced so that the modulator assembly can move into a second position to cut-off communication between the supply and the brake and subsequently reduce the pressure of fluid supplied to the brake. In such a construction the outlet port is connected to the expansion chamber.

The area of the drive piston is normally equal to or greater than the difference between the two areas of the pump plunger. This ensures that the modulator assembly is positively held in the first position and reduces the magnitude of pulsations fed back to brake applying means, suitably a pedal or a lever for operating an hydraulic master cylinder, is reduced.

Some embodiments of our invention are illustrated in the accompanying drawings in which.

Figure 1:
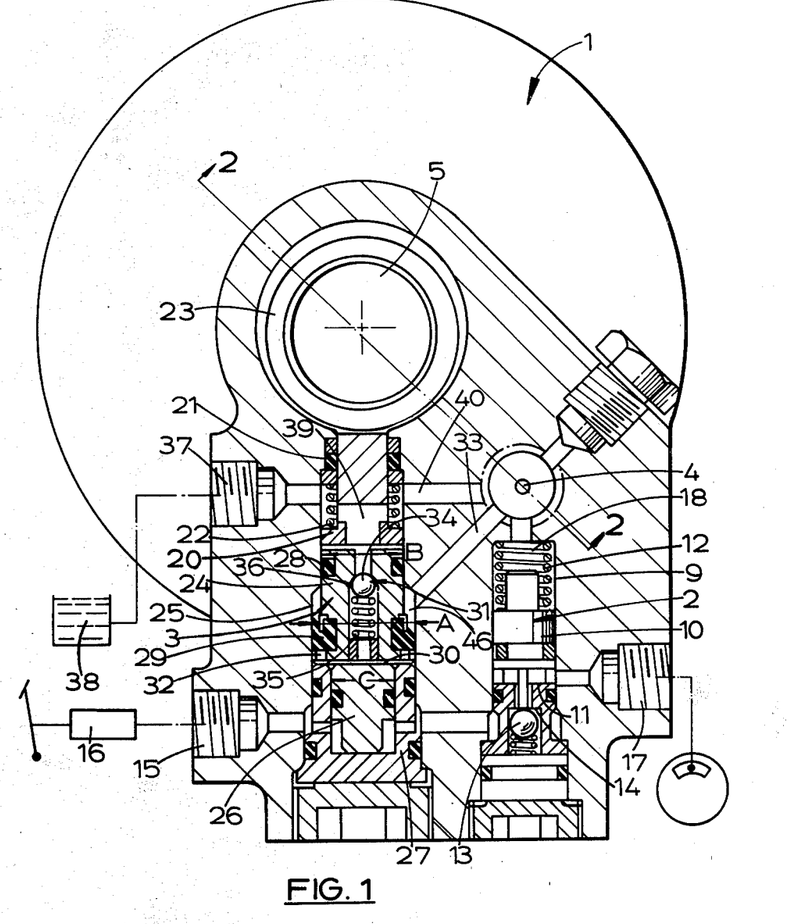
FIG. 1 is a transverse section through a combined modulator and skid sensing assembly for an hydraulic anti-skid braking system suitable for a motor-cycle.
Figure 2:
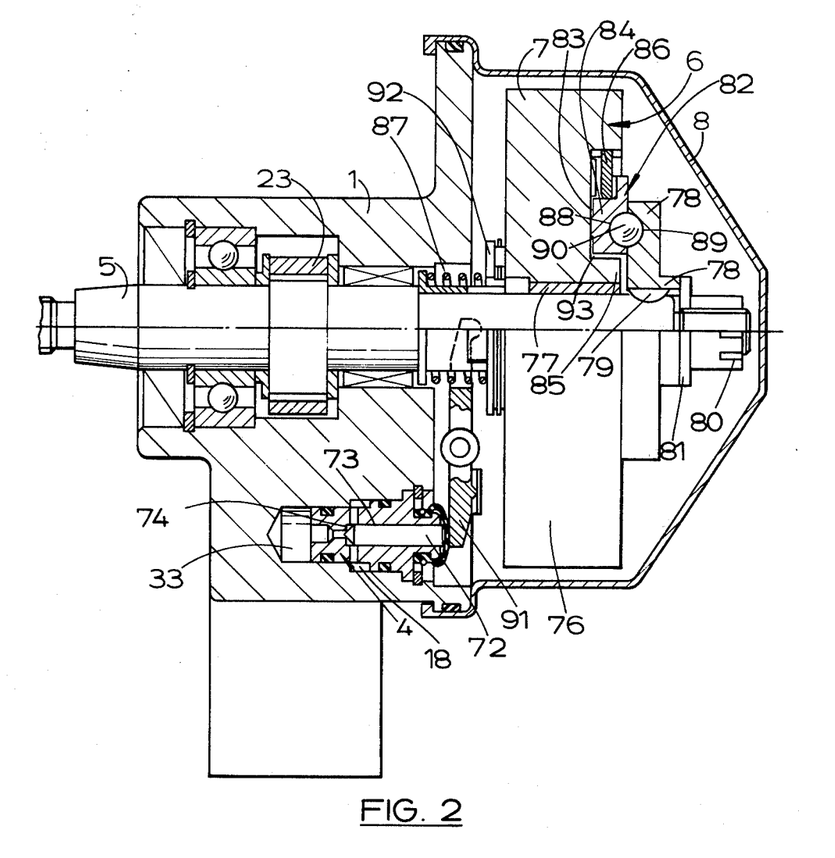
FIG. 2 is a section on the line 2—2 of FIG. 1.

The assembly illustrated in FIGS. 1 and 2 of the drawings comprises a housing 1 incorporating a modulator assembly 2, an hydraulic pump 3 and a pressure dump valve 4. A longitudinally extending shaft 5 projecting at opposite ends from the housing 1 is coupled at one end to the wheel and at the other end carries skid sensing means 6 in the form of a flywheel assembly 7 which is enclosed within a cylindrical guard 8 carried from the adjacent end of the housing 1.

The dump valve 4 comprises a valve member 72 which is guided to slide in a bore 73 and which is engageable at its inner end with a seating 74 in a closed position.

The flywheel assembly 3 comprises a flywheel 76 which is journalled for rotation on a bearing 77 on the shaft 5, a radial thrust member 78 in the form of plate which is keyed against relative rotation and axial movement with respect to the end of the shaft 5 by means of a woodruff key 79 and a constellated nut 80 which is screwed end to end of the shaft 5 and acts on the thrust member 78 through an washer 81, and a ball and ramp mechanism 82 clamped between the thrust member 78 and plain face 83 at the base of an annular recess in the adjacent end of the flywheel.

The ball and ramp mechanism 82 comprises an annular, reaction plate 84 which encircles, and is mounted on, the hub 85 of the flywheel 76 by means of a one-way drive unit and overrun clutch comprising a ratchet and pawl device 86 which is located between the face 83 and the plate 84.

The plate 84 engages at one end with the face 83 to form a friction overrun clutch biassed by a compression spring 87 and at the other end has a plain face in which is located a series of angularly spaced recesses 88 corresponding with, and superimposed upon, complementary recesses 89 in the adjacent face of the thrust member 78. Balls 90 are disposed in corresponding pairs of the recesses 88 and 89.

An annular clearance 93 is provided between the hub 85 and the plate 84 so that the plate can move radially through a limited distance to compensate for tolerance variations in the mechanism 82.

The dump valve 4 is normally closed and is operated by a lever 91 which is pivotably mounted at an intermediate point in its length on the housing 1. The spring 87 acts on the lever 91 to urge it at its outer end in a direction to hold the dump valve 4 closed with the valve member 72 in engagement with the seating 74, and the inner end of the lever 91 is normally spaced from a plain thrust washer 92 upon which the adjacent inner face of the flywheel 7 acts.

When the wheel is rotating in a "brakes-off" condition, or when the brake is applied normally in a non skid condition, the thrust member 78 rotates with the shaft 5, and the flywheel 76 is driven with it at the same speed through the ball and ramp mechanism 82, and then to the ratchet and pawl device 86.

If the deceleration of the wheel is excessive, the speed of rotation of the shaft 5 is reduced suddenly. However, due to its inertia, the flywheel 76 runs on and thus causes relative rotation to take place between the thrust member 78 and the reaction plate 84. The balls 90 ride up ramps comprising end walls of the recesses 88 and 89 so that simultaneously the reaction plate 84 and the flywheel 76 move axially relatively away from the thrust member 8. This moves the lever 91 angularly to permit the dump valve 4 to open with the valve member 72 moving away from the seating 74 and affect relief of the brake-applying fluid pressure in a manner hereinafter to be described.

Once the dump valve 4 has been opened fully, the reaction plate 84 rotates with the thrust member 78 to maintain the ball and ramp mechanism 82 in the expanded condition, but the flywheel 76 is permitted to rotate relative to the reaction plate 84 by slipping the device 86. Thus the flywheel 76 decelerates at a rate determined by the torque sustained by the overrun clutch and the rate of deceleration of the shaft 5.

Following brake release, the wheel will reaccelerate and as the wheel speed again approaches more closely the speed of rotation of the flywheel 76, the flywheel 76 can be moved angularly and axially in the opposite direction by the force in the spring 87, so that the components of the mechanism are returned to the position shown in the drawings, and the brakes can be reapplied.

The modulator assembly 2 comprises a bore 9 in which works a piston 10 which is normally urged into an inoperative position against a stop 11 by a spring 12. In this position the piston 10 urges a spring-loaded ball 13 away from a seating 14 to place an inlet port 15 for connection to an hydraulic master cylinder 16 in communication with an outlet port 17 for connection to a brake associated with the wheel which drives the shaft 5. The dump valve 4 is in communication with that end of the bore 9 which is remote from the valve 13, 14.

The pump 3 comprises a tappet 20 of stepped outline of which the end of smaller area works through a seal 21 in the housing 1 and is urged by a spring 22 away from the drive mechanism comprising a ring 23 which is freely rotatable on an eccentric portion of the shaft 5. A pump plunger 24 comprising a differential piston working in a stepped bore 25 is adapted to be engaged at its end of smaller area by the tappet 20 and at its end of greater area by a drive piston 26 working in the bore of a sleeve 27 of cup-shaped outline which acts as a closure for the end of the bore 25 which is of greater area. The end of the drive piston 26 remote from the plunger 24 is exposed to the pressure in the master cylinder 16.

The inner end portion of the pump plunger 24 which is of smaller area carries an 'O' ring seal 28 engaging slidably with the complementary portion of the bore 25 and the portion which is of greater area carries a lip seal 29 engaging slidably with the complementary portion of the bore 25. A secondary working chamber 46 is defined by the annular volume bounded by the bore 25, the plunger 24, the seal 28, and the seal 29.

A primary working chamber 30 is defined in the plunger 24 and the bore 25 between a first one-way valve 31 in the plunger 24, the drive piston 26, and a second one-way valve constituted by the lip seal 29 controlling flow through ports 32 in the end of the plunger 24 which is of greater area.

The lip seal 29 area permits flow from the primary working chamber 30 to the secondary working chamber 46, which is connected by a passage 33 to the dump valve 4. The first one-way valve 31 comprises a ball 34 which is normally urged by a spring 35 in a direction to engage with a seating 36 in the plunger 24 to isolate the primary working chamber 30 from communication with a port 37 connected to a reservoir 38 through supply passages 39 in the tappet 20.

An expansion chamber 18 is defined by that portion of the bore 9 between the piston 10 and the dump valve 4, the passage 33, and the secondary working chamber 46.

A return passage 40 to the reservoir 38 communicates with the expansion chamber 18 when the dump valve 4 is open.

The area C of the drive piston 26 is equal to or greater than the difference in area between the area A and B of the greater and smaller area ends of the plunger 24.

When the wheel is rotating in a "brakes-off" condition, the dump valve 4 is closed to cut-off communication between the reservoir 38 and the expansion chamber 18. The plunger 24 is held in an inoperative retracted position shown, by the fluid trapped between the dump valve 4 and the lip seal 29 which constitutes the second one-way valve, and by the spring 22. Thus the pump 3 is disabled and no pumping can take place.

During normal braking fluid from the master cylinder 16 is applied to the brakes through the ports 15 and 17, and through the clearance between the ball 13 and the seating 14. In addition the pressure from the master cylinder 16 acts on the drive piston 26 to urge it, and the pump plunger 24, relatively towards the ring 23. However this causes the plunger 24 to create a higher pressure in the expansion chamber 18. Thus the pump 3 remains disabled and the piston 10 is held firmly against the stop 11.

If the angular deceleration of the braked wheel exceeds a predetermined value, the skid sensing means 6 is operative to open the dump valve 4. This relieves the pressure trapped in the expansion chamber 18, by connecting it to the reservoir 38 through the return passage 40.

This reduction in pressure causes the piston 10 to be unbalanced so that it moves to permit the ball 13 to engage with the seating 14 which cuts off the supply to the brake. Further movement of the piston 10 in the same direction expands the brake volume to reduce the pressure applied to the brake. This same reduction in pressure in the expansion chamber 18 reduces the force on the plunger 24 which opposes the force of the pressure from the master cylinder 16 acting on the drive piston 26. Thus the drive piston 26 and the tappet 20 are able to urge the plunger 24 relatively towards the ring 23 through a distance sufficient for the tappet 20 to engage with the ring 23. Thus the plunger 24 is reciprocated in the bore 25 by the ring 23 which, in turn, is oscillated by rotation of the shaft 5.

The output of the pump 3 is determined by the stroke of the plunger 24 multiplied by the areas (A-C).

As the plunger 24 is moved towards the ring 23 fluid from the reservoir 38 is drawn into the increasing volume of the primary working chamber 30 through the first one-way valve 31, and the lip seal 29 pumps fluid from the secondary working chamber 46 into the passage 33. As the plunger 24 is moved in the opposite direction the first one-way valve 31 closes and the fluid in the primary working chamber 30 is displaced past the lip seal 29. Since the volume of the secondary working chamber 46 is less than that of the primary working chamber 30, some of the displaced fluid passes into the passage 30.

The pump 3 is therefore double-acting to pump fluid into the passage 33 upon movement of the plunger 24 in each of two opposite directions.

Whilst the dump valve 4 remains open fluid is pumped by the pump 3 in a closed circuit from the reservoir 38, to which it is returned.

At the termination of a skid signal the dump valve 4 closes to isolate the expansion chamber 18 from the reservoir 38, so that the pump 3 is then operative to increase the pressure in the expansion chamber 18. The increase in pressure in the expansion chamber 18 moves the piston 10 outwardly, to re-pressurise fluid in the brake line and, if no further skid signal is received, urges the ball 13 away from the seating to re-establish communication with the master cylinder 16. When the piston 10 abuts the stop 11 the plunger 24 is moved to the extremity of the travel of the ring 23 and the pressure of the fluid trapped in the expansion chamber 18, acting on the plunger 24 over the lip seal 29, holds the plunger 24 in an inoperative position as described above, in which the pump 3 is disabled.

During operation of the pump 3 the magnitude of the pulsation felt at the pedal or lever operating the master cylinder 16, which occurs upon movement of the drive piston 26 in an outward direction towards the closed end of the sleeve 27, is determined by the stoke of the pump plunger 24 multiplied by the area C.

For example if a skid signal is given and the dump valve 4 relieves the pressure in the expansion chamber 18, the pump plunger 24 is driven towards the eccentric cam 23 and the pump 3 produces a volume of $(A-B) \times$ stroke. However, it draws in from the tank $(A-C) \times$ stroke. When the plunger 24 is driven away from the cam 23 the pump 3 produces a volume of $(B-C) \times$ stroke. Therefore the output of the pump 3 is $[(A-B)+(B-C)] \times \text{stroke} = (A-C) \times \text{stroke}$.

In an alternative arrangement, the seal 29 may be a plain seal similar to the seal 28, and the second one-way valve may comprise a spring biassed valve member adapted to engage a seating formed in a passage between the primary and secondary working chambers 30 and 46. Such a passage may be provided either in the plunger 24 or in the housing 1.

Figures 3, 4, 5:
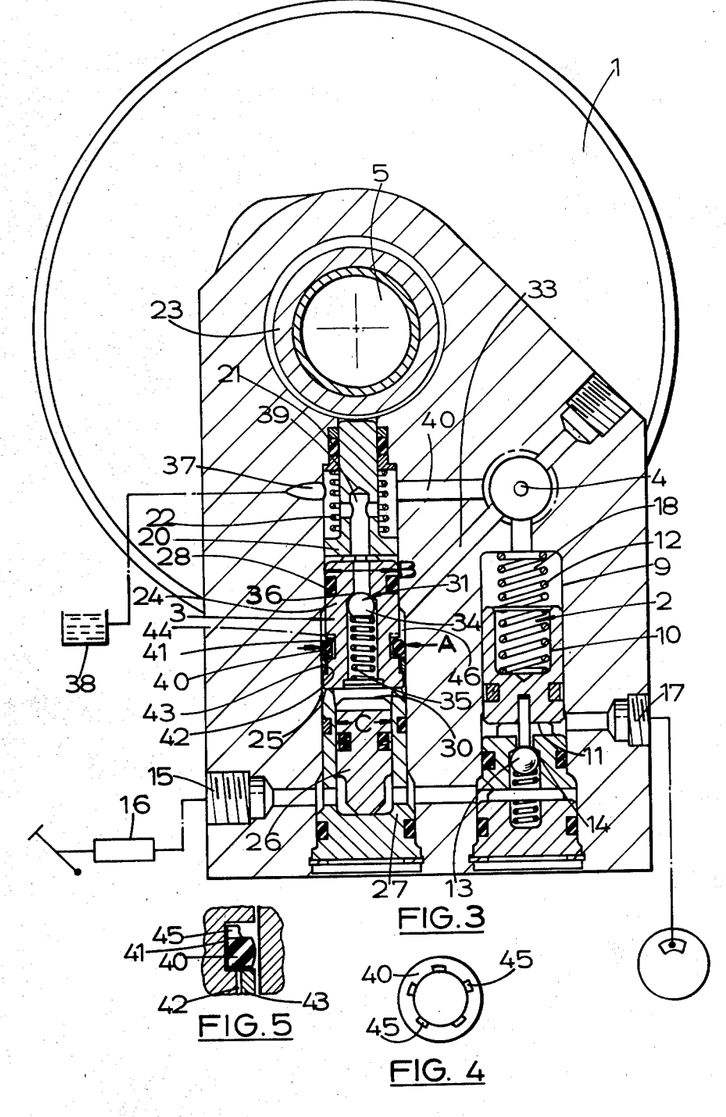
FIG. 3 is a section similar to FIG. 1 but incorporating a modified hydraulic pump.
FIG. 4 is a plan of a modified seal for use in the assembly of FIG. 3.
FIG. 5 is a section through the seal in its position of use.

In the assembly of FIG. 3 the second one-way valve incorporated in the pump 3 is of modified construction. As illustrated the ports 32 are omitted and the lip seal 29 is replaced by a sealing ring 40 having an internal diameter which is significantly larger than the diameter of a radial groove 41 in the pump plunger 24 in which it is received, and an axial thickness which is less than the length of the groove 41 itself. A portion of the plunger 24 at the end of the groove 41 remote from the seal 28 is provided with a radial relief 42 of which the radial depth is less than that of the groove 41, and a loose fitting back-up ring 43 is received in the relief 42. Finally the wall of the plunger 24 at the end of the groove 41 which is adjacent to the seal 28 is provided with a pair of diametral flats 44.

During movement of the plunger 24 relatively towards the ring 23 with the one-way valve 31 open the sealing ring 40 seals tightly against a face on the plunger at the lower end of the groove 41, thereby to close the second one-way valve. During movement of the pump plunger 24 in the opposite direction with the first one-way valve 31 closed, the sealing ring 40 moves relatively into engagement with the face on the plunger 24 at the upper opposite end of the groove 41. Due to the provision of the flats 44 and the back-up ring 43 fluid can be pumped from the primary working chamber 30 to the secondary working chamber 46 and the passage 33 through annular clearances between the back-up ring 43 and the plunger 24, and between the sealing ring 40 and the plunger 24, and through the flats 44.

The construction and operation of the modulator illustrated in FIG. 3 is otherwise the same as that of FIGS. 1 and 2 and corresponding reference numerals have been applied to corresponding parts.

In another construction the flats 44 are omitted and, as illustrated in FIGS. 4 and 5, the sealing ring 40 is provided on its upper face with a series of castellations 45 for engagement with the adjacent face on the plunger 24 at the upper end of the groove 41.

The pump 3 may be replaced by a pump of the double-acting type incorporating two separate plungers operated by a common drive.

Figure 6:
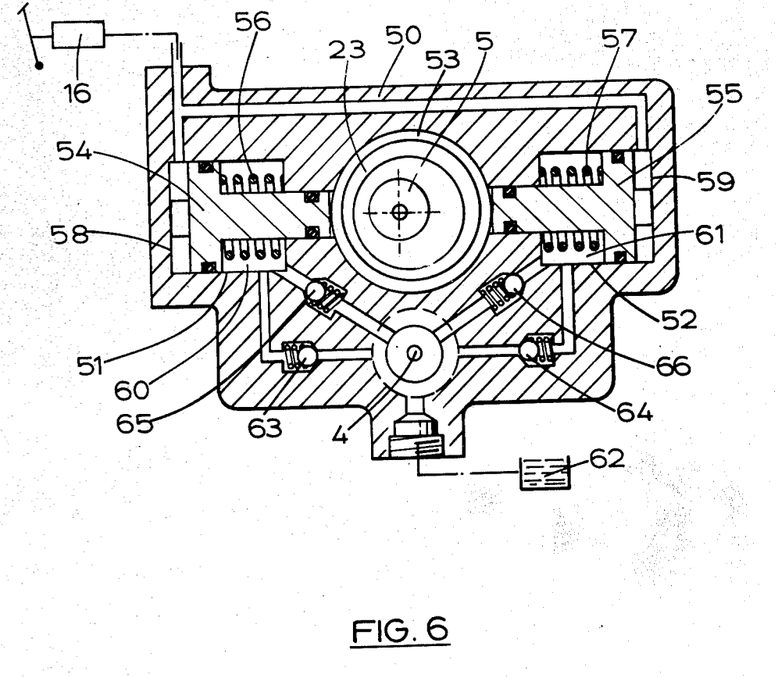
FIG. 6 is a longitudinal section through another hydraulic pump.

As illustrated in FIG. 6 of the accompanying drawings the pump 3 comprises a housing 50 having a pair of co-axial symmetrically arranged, stepped bores 51, 52 of which the inner ends, which are of smaller area, lead into a chamber 53 through which the shaft 5 projects. Pump plungers 54, 55 of stepped outline work in the bores and the inner ends of the plungers 54, 55 are engagable with the ring 23. However, in the normal inoperative position illustrated in the drawings, the plungers 54, 55 are held by compression springs 56, 57 in retracted positions in engagement with stop faces 58, 59 at the ends of the bores 51, 52 which are of greater area. In this position, with the master cylinder 16 inoperative, the pump 3 is disabled.

A pumping chamber 60, 61 is defined between each bore 51, 52 and the portion of each plunger 54, 55 which is of greater area and each pumping chamber 60, 61 is connected to a reservoir 62 through a first one-way valve 63, 64 respectively, and to the dump valve 4 through a second oppositely arranged one-way valve 65, 66 respectively.

The master cylinder 16 is connected through passages in the housing 50 to the ends of the bores 51, 52 which are of greater area so that, when the master cylinder is operated, both plungers 54 and 55 are urged towards, and into engagement with the ring 28 with the result that fluid is drawn from the reservoir 62 and into the pumping chamber 60, 61 on induction strokes, and is pumped to the dump valve 4 through the one-way valves 65, 66 on compression strokes.

The plungers 54 and 55 are 180° out of phase and are equal in area so that pulsations which otherwise would be felt at the pedal of the master cylinder 16 are eliminated.

Figure 7:
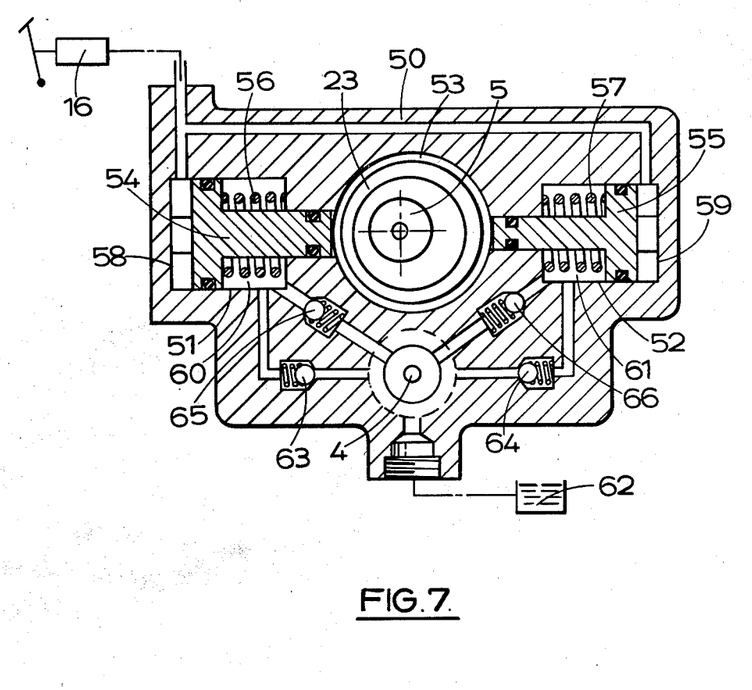
FIG. 7 is a view similar to FIG. 6 but showing a modification.
Figure 8:
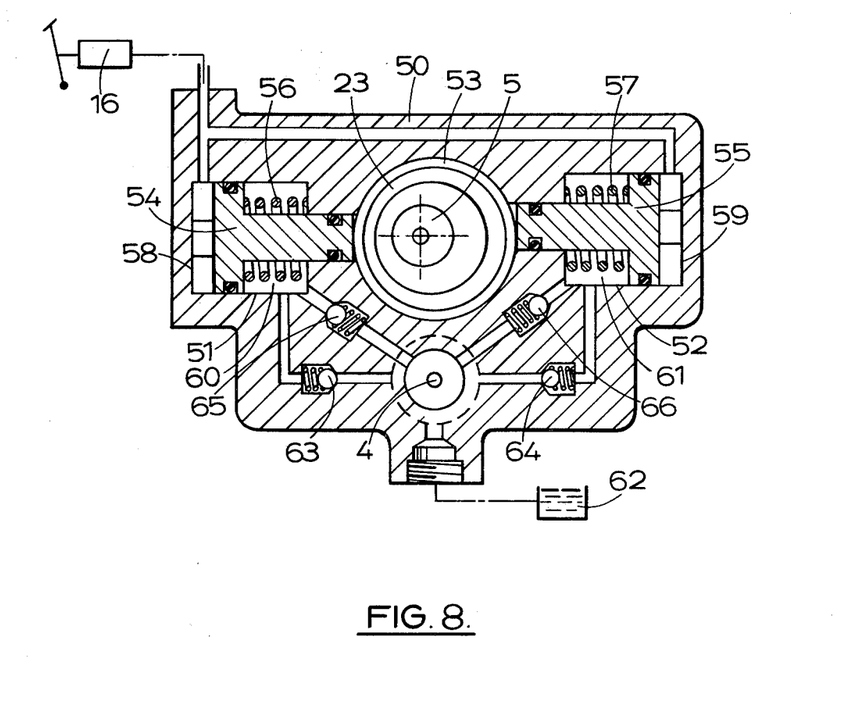
FIG. 8 is another view similar to FIG. 6.

Should a degree of pulsation be required, the plungers may be of different areas, as shown in FIG. 7, or they may be of equal areas but lie in a different angular relationship, as shown in FIG. 8.

The construction and operation of the pumps of FIGS. 6-8 are otherwise the same as that described above and corresponding reference numerals have been applied to corresponding parts. Where used herein the term "double acting" is intended to cover pumps in which more than one pump delivering stroke occurs for each pump cycle. Thus pumps having more than two plungers are intended to be covered by this definition.

I claim:

1. An hydraulic anti-skid braking system for a vehicle having a wheel, comprising a brake for braking the wheel, a supply of brake-operating fluid for applying said brake, skid sensing means for said wheel for producing skid signals, a modulator assembly for modulating said brake-operating fluid from said supply to said brake in accordance with said skid signals, an hydraulic pump of the double-acting type, said hydraulic pump having a piston assembly comprising relatively movable plunger parts, and having a working chamber which is in communication with said modulator assembly to control brake re-application following skid correction, a drive mechanism for said pump, a reservoir for hydraulic fluid, a dump valve for controlling fluid in said working chamber to which said piston assembly is exposed at least after said brake has been applied, said dump valve being normally closed to hold said piston assembly in a retracted position in which said piston assembly is disengaged from said drive mechanism, and said dump valve being movable in response to said skid signal to release fluid from said working chamber to render said drive mechanism operative, fluid-pressure biassing means operative in conjunction with said drive mechanism to cause relative movements of said plunger parts in a pump cycle to draw fluid from said reservoir in an induction stroke and to deliver fluid to said working chamber in a delivery stroke to pressurise same following said skid correction, whereby to re-apply said brake, and valve means operative in conjunction with said biassing means and said drive mechanism to provide at least two delivery strokes during each said pump cycle.

2. A system as claimed in claim 1, wherein the pressure of said operating fluid comprises the pressure of said supply.

3. A system as claimed in claim 1, wherein said pump is provided with at least two separate plungers.

4. A system as claimed in claim 3, incorporating a central drive, wherein said plungers are of equal size and are oppositely arranged on opposite sides of said central drive.

5. A system as claimed in claim 4, wherein said plungers are of different sizes.

6. A system as claimed in claim 3, wherein said plungers are of equal sizes and their axes are relatively displaced.

7. An hydraulic anti-skid braking system for a vehicle having a wheel, comprising a brake for braking the wheel, a supply of brake-operating fluid for applying said brake, skid sensing means for said wheel for producing skid signals, a modulator assembly for modulating said brake-operating fluid from said supply to said brake in accordance with said skid signals, and an hydraulic pump, said hydraulic pump incorporating at least one plunger working in a bore and having a working chamber which is in communication with said modulator assembly to control brake re-application following skid correction, a drive mechanism for said pump, an expansion chamber, and a reservoir for fluid, wherein said pump has a single plunger which is urged in one of two opposite directions by said supply of operating fluid and in the other of the said two opposite directions by said drive mechanism, and wherein said pump plunger is of differential outline working in said bore which is stepped and said pump plunger has an end of smaller area and an end of greater area, said end of smaller area being exposed to said reservoir, said end of greater area being exposed to said working chamber, a first one-way valve permitting flow into said working chamber from said reservoir upon movement of said plunger in a first direction towards said drive mechanism, a second one-way valve permitting flow into said expansion chamber from said working chamber upon movement of said plunger in a second opposite direction, and a drive piston for urging said plunger in the said first direction.

8. A system as claimed in claim 7, wherein said drive piston is exposed at one end to the pressure in said working chamber and at the opposite end to said supply of operating fluid.

9. A system as claimed in claim 7, wherein said drive piston is an extension of said plunger, and said drive piston is only exposed to said supply of operating fluid.

10. A system as claimed in claim 7, wherein a spring loaded tappet is adapted to urge said end of smaller area away from said drive mechanism.

11. A system as claimed in claim 10, wherein said tappet is separate from said plunger, being exposed to atmosphere at an end adjacent to said drive mechanism, and at the opposite end to atmosphere.

12. A system as claimed in claim 10, wherein said tappet is integral with said plunger.

13. A system as claimed in claim 7, wherein said drive piston is of an area at least equal to the difference between the two areas of said pump plunger.

14. A system as claimed in claim 7, wherein said first one-way valve comprises a valve member, a seating in said pump plunger, and a spring for urging said valve member against said seating.

15. A system as claimed in claim 14, wherein a seal is provided on said pump plunger and the second one-way valve comprises a valve member, and a seating on the opposite side of said seal from said first one-way valve and with which said valve member is engageable.

16. A system as claimed in claim 14, wherein said second one-way valve comprises a valve seal on said pump plunger for permitting flow past that seal in response to movement of said pump plunger in one direction, a passage leading to said expansion chamber from the stepped bore at a position between said seal and a second seal between said bore and said portion of said plunger which is of smaller area and through which fluid is pumped past said valve seal upon movement of said plunger in the said second opposite direction and by said plunger itself upon movement of said plunger in the said first direction, with said second one-way valve in a closed position.

17. A system as claimed in claim 16, wherein ports are provided in said end of said plunger which is of greater area, and said valve seal comprises a lip seal for controlling flow through said ports.

18. A system as claimed in claim 16, wherein said valve seal comprises a radial groove in said pump plunger defined between spaced opposite faces, a sealing ring of an internal diameter greater than the external diameter of said radial groove in which it is received and of an axial thickness less than the length of said groove itself, and said ring is engageable with said spaced opposite faces of the plunger, a clearance being provided between said sealing ring and one of the said faces with said ring engages to permit flow past said sealing ring when said ring engages with the said one face in response to movement of said plunger in the said opposite direction.

19. A system as claimed in claim 18, wherein a portion of said plunger at the end of said groove remote from the said one face is provided with a radial relief, and a loose back-up ring is received in said relief.

20. A system as claimed in claim 16, wherein said clearance is defined by at least one flat on said plunger.

21. A system as claimed in claim 16, wherein said clearance is defined by gaps between castellations on said ring when said castellations are in engagement with the said one face.

22. An hydraulic anti-skid braking system for a vehicle having a wheel, comprising a brake for braking the wheel, a supply of brake-operating fluid for applying said brake, skid sensing means for said wheel for producing skid signals, a modulator assembly for modulating said brake-operating fluid from said supply to said brake in accordance with said skid signals, and an hydraulic pump, said hydraulic pump incorporating at least one plunger working in a bore and having a working chamber which is in communication with said modulator assembly to control brake re-application following skid correction, wherein said modulator assembly incorporates an expansion chamber to which said working chamber of said pump is connected, and a dump valve is disposed between the expansion chamber and a reservoir for fluid, said dump valve being movable by said skid sensing means between a normally closed position in which said expansion chamber is pressurised so that said modulator assembly is held in a first position permitting said operating fluid to be supplied to said brake and a open position when said skid signal is received whereby the pressure in said expansion chamber is reduced so that said modulator assembly can move into a second position of cut-off communication between said supply and said brake and subsequently reduce the pressure of fluid supplied to said brake.

23. A system as claimed in claim 23, in which an outlet port is connected to said expansion chamber.

* * * * *